Jan. 4, 1938.  P. G. DE MARTINI, JR  2,104,342
TABLE ACCESSORY
Filed March 17, 1937
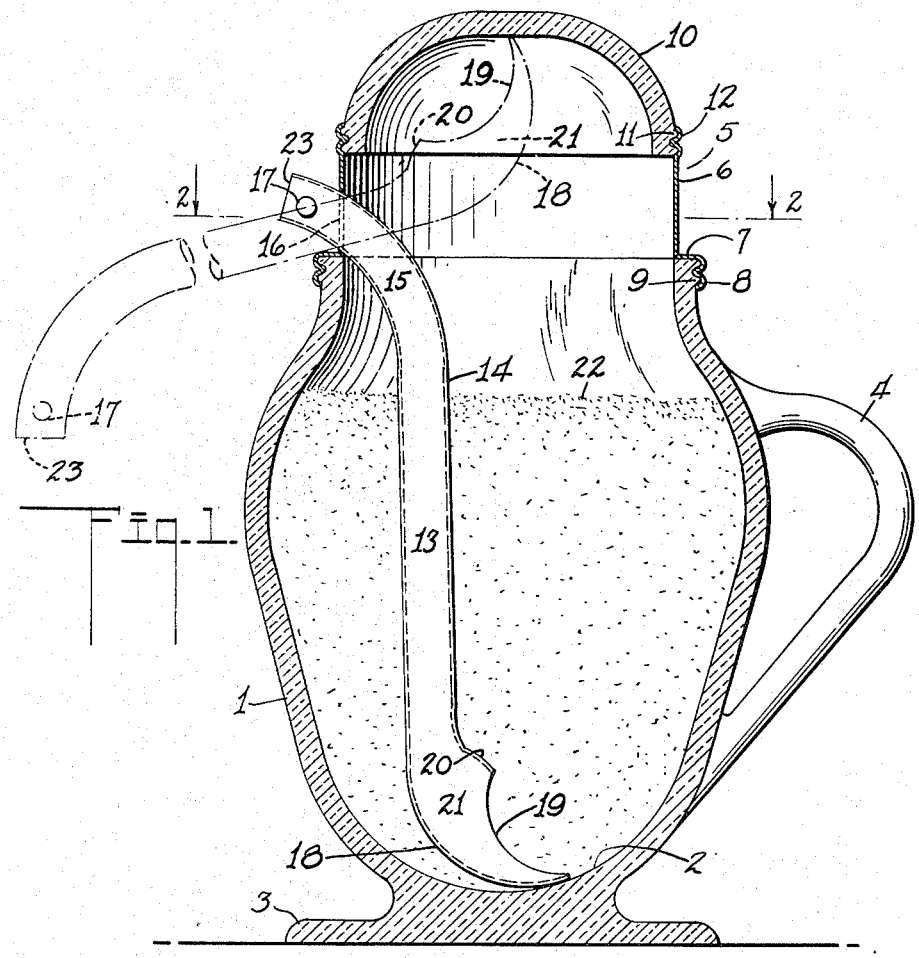
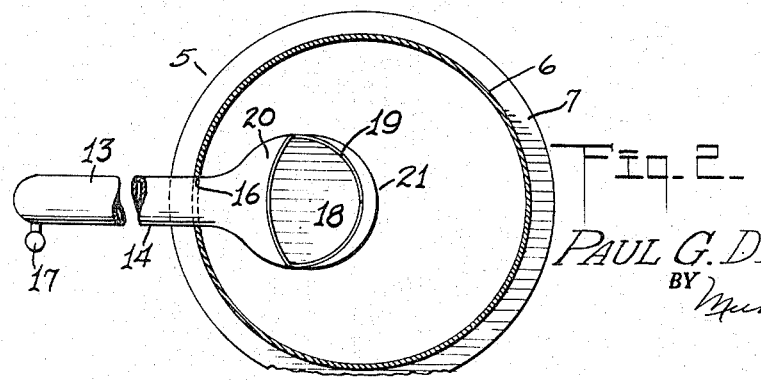
INVENTOR.
PAUL G. DE MARTINI JR.
BY
ATTORNEYS.

Patented Jan. 4, 1938

2,104,342

UNITED STATES PATENT OFFICE 2,104,342

TABLE ACCESSORY

Paul G. De Martini, Jr., San Francisco, Calif.

Application March 17, 1937, Serial No. 131,319

5 Claims. (Cl. 221—97)

My invention relates to improvement in a table accessory and it consists of the combinations, constructions, and arrangements hereinafter described and claimed.

An object of my invention is to provide a table accessory that is an improvement over my Patent No. 1,857,712, issued May 10, 1932. In the patent I show a sugar bowl provided with a cover that is permanently attached to the bowl and in which an opening for receiving a spoon handle extends approximately three-quarters of the distance around the cover. I have found that this opening which lies in a horizontal plane, permits flies and dirt to enter the sugar bowl. The permanently attached cover prevents the bowl from being cleaned thoroughly.

An object of my invention is to provide a bowl cover with an opening just large enough to receive the handle of the scoop or spoon and permit the spoon to be manipulated for removing sugar from the bowl in the manner set forth in the patent. I further provide the opening in a vertical wall portion of the cover and therefore no foreign substances are likely to enter the bowl through this opening. The spoon handle substantially closes the opening.

The cover for the bowl has a metal portion that is preferably threaded on to the top of the bowl. This permits the cover to be removed when washing the bowl. The entire cover may be made of metal or any other material desired or the cover may be made partly of metal and partly of glass. The glass portion may be an insert forming the top of the cover. I have found it advisable to make that portion of the cover contacting with the glass bowl, out of metal rather than glass in order to avoid glass contacting with glass, which will cause chipping.

The bowl is preferably made of glass although I do not wish to be confined to any particular material, and it may be provided with one or more handles of any shape desired. The bowl may be of any shape and height desired that will make a pleasing appearance. I have found that if the bowl is stream-lined it will give a pleasing appearance. One of the principal features of the bowl is the provision of a rounded bottom for the bowl interior that cooperates with the spoon or scoop for permitting all of the sugar to be removed from the bowl.

The spoon or scoop is provided with a curved hollow handle and the ladle portion is so designed that it will cooperate with the rounded bottom of the bowl to remove the last particles of sugar or other material from the bowl. Furthermore, the ladle portion of the scoop has a curved bottom that will cause the sugar to more readily flow through the hollow handle, and therefore the hollow handle need not be inclined at such a steep angle to discharge the sugar therethrough. The end of the handle that projects through the opening in the cover may be provided with one or more knobs which may be grasped when manipulating the spoon or scoop. This will obviate the tendency of a person grasping the end of the spoon through which the sugar passes and will make the device more sanitary.

The rear portion of the ladle is flared to provide a backstop for preventing the sugar from flowing onto the outer surface of the hollow handle and then flowing along this surface and finally passing through the opening in the cover. The scoop when in pouring position is placed far enough away from the opening in the cover to permit any sugar that might flow onto the outer surface of the handle, to drop by gravity back into the bowl before it finds its way through the cover opening. The result is that the only sugar that can flow from the bowl, must pass through the hollow handle.

The device is extremely simple in construction and provides a novel means for securing a scoop or spoon to a bowl while permitting it to be manipulated for removing one spoonful of sugar at a time from the bowl and guiding this sugar through the hollow handle of the spoon by gravity to the desired place.

Other objects and advantages will appear in the following specification, and the novel features of the device will be particularly pointed out in the appended claims.

My invention is illustrated in the accompanying drawing forming a part of this application, in which Figure 1 is a vertical section through the device showing the spoon in elevation; and Figure 2 is a section along the line 2—2 of Figure 1.

In carrying out my invention I provide a sugar bowl indicated generally at 1 and this bowl may be of any shape desired and of any height. One of the principal points of novelty in the shape of the sugar bowl is the rounding of the bottom of the interior of the bowl in the manner shown at 2. A base 3, of any desired shape, supports the bowl in proper position. One or more handles 4, also of any desired shape, extends from the side of the bowl.

A cover indicated generally at 5 is secured to the top of the bowl, in any manner desired, and as already stated, the cover may be made of any material desired, such as metal, glass, etc. I have found it advisable to make the portion of the cover that contacts with the top of the bowl, out of metal. This metal portion is indicated at 6 and has a shoulder 7 designed to rest upon the top of the bowl. This shoulder 7 carries a threaded flange 8 and this flange screws upon a threaded portion 9 of the bowl. The shoulder 7 prevents sugar from lodging on the rim of the bowl and therefore a removal of the cover will not permit any sugar from falling off from the bowl rim.

The cover 5 carries a glass insert 10, which is threaded at 11 and designed to be secured to a threaded portion 12 of the metal part 6. It should be understood that the entire cover 5 may be made of metal, but I have found that providing the cover with a glass top or insert, will permit a person to watch the ladle portion of the spoon and therefore control the operation of the scoop or spoon more effectively.

I provide a scoop or spoon 13 of the shape shown in Figure 1 although I do not wish to be confined to this exact shape. The spoon or scoop has a hollow handle 14 with a curved end 15. The handle projects through an opening 16 in the metal portion 6 and may be provided with a knob 17, see Figure 2.

The ladle portion of the spoon or scoop 13 is indicated at 21 and is provided with a rounded bottom portion 18 and an open mouth 19. The rear portion of the mouth 19 has a flared wall 20 that merges into the hollow handle 14. Figure 2 shows the curved wall 18 also widened transversely for receiving a spoonful of sugar 22 contained in the bowl. The curved ladle wall 18 cooperates with the curved bowl bottom 2 to permit the spoon to be manipulated for removing the last bit of sugar from the bowl.

The ladle 21 also performs an additional function when the spoon is tilted into the pouring position shown by the broken lines in Figure 1. The curved wall 18 extends above the lower wall of the hollow handle a considerable distance and this will cause the sugar in the ladle to quickly gravitate through the hollow handle and out the open end 23. The spoon handle need therefore not be inclined to so great an extent from the horizontal in order to effect a flow of sugar. The flared rear wall 20 of the ladle, prevents the sugar in the ladle from overflowing and traveling along the top surface of the hollow handle to the opening 16. The ladle portion is also far enough removed from the opening 16 to prevent any sugar that might flow onto the top of the hollow handle, from finding its way past the opening, because this sugar will drop off from the handle by gravity and will fall back into the bowl before it reaches the opening. The opening 16 is also made small enough just to receive the hollow handle and to permit a rocking of the handle into a slightly inclined position for pouring purposes. The hollow handle will therefore act as a closure for the opening and will prevent any accidental spilling of the sugar through the opening.

In the operation of the device the spoon may be manipulated any number of times desired and will deliver one spoonful of sugar during each operation. This sugar will be kept in a sanitary condition at all times due to the fact that the handle 14 closes the opening 16. The sugar can be scooped from the bowl a spoonful at a time without removing the spoon from the bowl. The spoon is so designed that it can be actuated to first elevate the sugar and then to discharge it into a cup or other receptacle by gravity.

The advantage of this device over my patent lies first in a cover that may be unscrewed from the bowl for cleaning and filling purposes. Second, the cover has an opening just large enough to receive the hollow handle of the spoon and this handle is curved gracefully to facilitate the passage of sugar therethrough. Third, the ladle portion of the spoon and the interior of the bowl bottom are shaped to facilitate the scooping of the last spoonful of sugar from the bowl bottom. Fourth, the cover may have a glass insert in its top if desired in order that the bowl contents may be viewed while scooping the sugar. The metal band 6 for the cover may be of any color desired. Fifth, the opening in the cover is solely in the metal band and this permits the cover to be readily unscrewed from the bowl. It is possible to provide an all glass cover in which the threads are lined with metal to prevent glass touching glass and chipping. In case of an all glass cover, the opening for the spoon handle would also be lined with metal.

While I have shown only the preferred form of my invention, it should be understood that various changes or modifications may be made within the scope of the appended claims without departing from the spirit of the invention.

I claim:

1. A spoon having a hollow handle curved in one direction at one end, and a ladle at the other end of the handle and curved in the other direction.

2. A spoon having a hollow handle curved in one direction at one end, and a ladle at the other end of the handle and curved in the other direction, the rear portion of the ladle being shaped for causing all of the material in the ladle to flow into the handle when the handle is held in pouring position.

3. A condiment container and dispenser comprising a bowl having its bottom interior substantially spherical in shape, a cover removably secured to the bowl and having an opening for receiving a condiment dispenser, and a condiment dispenser having a hollow handle slidably mounted in the opening, and a ladle communicating with the handle and being spherical-shaped for cooperating witth the spherical-shaped bowl bottom for removing all of the material in the bowl, the spherical-shaped portion of the ladle being tangent to the underside of the hollow handle for aiding the flow of material through the handle when the handle is swung into the proper inclined position.

4. A condiment container and dispenser comprising a bowl having its bottom interior substantially spherical in shape, a cover removably secured to the bowl and having an opening for receiving a condiment dispenser, and a condiment dispenser having a hollow handle slidably mounted in the opening, and a ladle communicating with the handle and being spherical-shaped for cooperating with the spherical-shaped bowl bottom for removing all of the material in the bowl, the spherical-shaped portion of the ladle being tangent to the underside of the hollow handle for aiding the flow of material through the handle when the handle is swung into the proper inclined position, said cover having a transparent insert to enable a person to see the amount of the material being dispensed, said insert being cup-shaped for providing room to receive the ladle during the pouring position of the dispenser.

5. In combination, a transparent bowl for condiments, a cylindrical sleeve removably secured to the bowl, the wall of the sleeve being vertical and having an opening therein, a transparent insert closing the top of the sleeve, and a hollow handled spoon slidable in the opening, a ladle integral with the inner end of the handle and communicating therewith, said spoon being swingable for elevating a ladle full of material and for causing this material to gravitate through the handle.

PAUL G. DE MARTINI, Jr.